3,556,985
CATALYST COKE CONTROL IN A REFORMING REACTION
Charles S. McCoy, Orinda, Calif., assignor to Chevron Research Company, San Francisco, Calif., a corporation of Delaware
Filed May 7, 1969, Ser. No. 822,569
Int. Cl. C10g 35/08, 39/00
U.S. Cl. 208—65                                    7 Claims

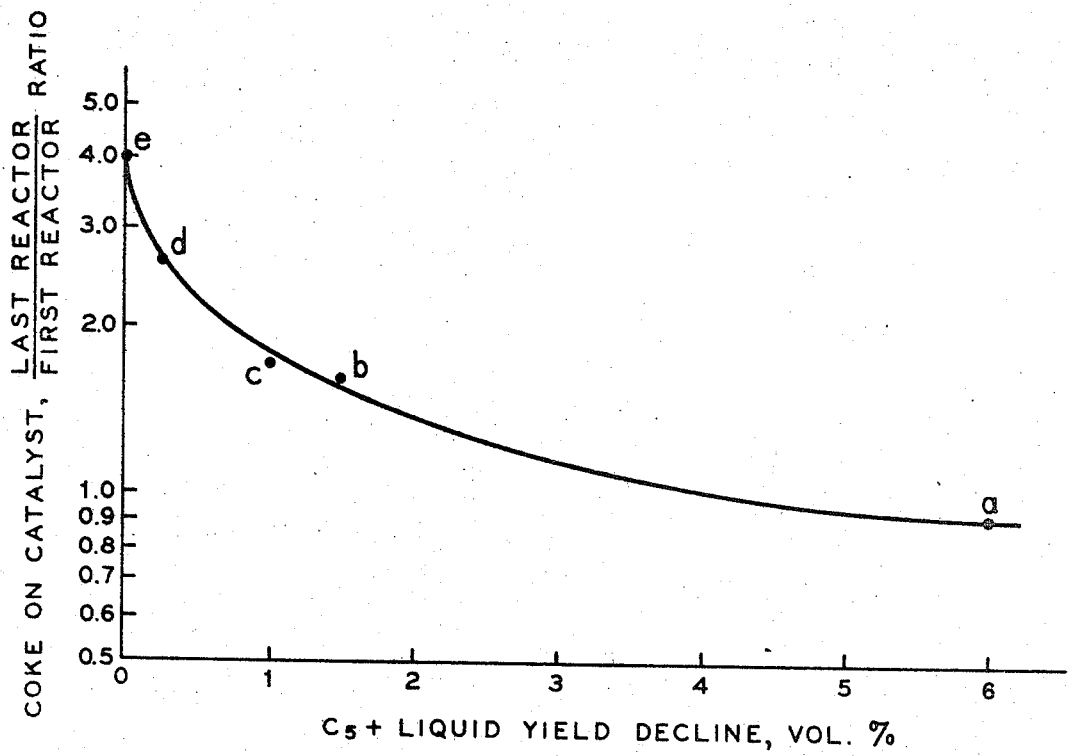

ABSTRACT OF THE DISCLOSURE

Yield stability of a reforming process involving a plurality of reaction zones containing catalyst can be improved by periodically removing during the reforming process catalyst samples from at least the first and the last reactors in the series, analyzing the amount of coke deposition and controlling the severity of reforming in the several reactors in response to the coke analysis so that the coke deposition on the catalyst in the first reactor can be maintained at less than one-half of the coke deposition on the catalyst in the last reactor.

BACKGROUND OF THE INVENTION

Field

The present invention is directed to the catalytic reforming of hydrocarbon fractions. More specifically the present invention is concerned with reforming in a plurality of reaction zones in series using a platinum-containing catalyst to improve the octane rating of the feed.

Prior art

Reforming of a naphtha fraction is generally accomplished by passing the fraction through a plurality of reaction zones in series, each zone containing a catalyst comprising a hydrogenation-dehydrogenation component supported on a porous solid carrier. Platinum on alumina is a principal catalyst for reforming. The naphtha fraction to be reformed is contacted in a first reaction zone with a platinum-containing catalyst and at reaction conditions to convert principally naphthenes to aromatics. While the dehydrogenation of naphthenes is the principal reaction, other reactions may occur to a minor extent, for example, isomerization of methylcyclopentane, hydroisomerization of paraffins, and hydrocracking. Inasmuch as the principal reaction in the first zone is endothermic, the effluent from the first reaction zone will be at a temperature generally lower than that of the feed. Hence, the effluent from the first reaction zone must be heated to the desired inlet temperature prior to introduction to the second reaction zone. The effluent from the second and each subsequent reactor is reheated prior to being passed to another reactor. In the last reaction zone the principal reactions are the dehydrocyclization of paraffins to produce aromatics in the feed and the hydrocracking of high boiling components. The reactions in the final reaction zone are generally slow reactions in comparison with the dehydrogenation of naphthenes.

During prolonged reforming the catalyst in the respective reaction zones become deactivated principally from the accumulation of carbonaceous deposits thereon. With the loss in activity of the catalyst the reaction temperatures must be increased to maintain conversion at the desired level. The fastest catalyst reactivation occurs in the terminal reactor where paraffin dehydrocyclization and hydrocracking are the principal reactions. Coke deposition on the catalyst, apart from decreasing the activity of the catalyst, results in a degrease in yield of $C_5+$ gasoline product produced. Thus, the yield of $C_5+$ gasoline product generally decreases throughout the reforming process.

The current trend is towards increasing the octane number of the product which has the effect of increasing the deactivation of the catalyst; yield decline is also increased. Any decrease in yield represents a significant loss to the refinery. It is therefore considered important to be able to control conditions in the different reaction zones to permit increase in severity of operation while maintaining high yield of $C_5+$ gasoline product as well as high yield stability throughout the run, that is, low yield decline.

SUMMARY OF THE INVENTION

It has now been found that the $C_5+$ liquid yield decline can be measurably decreased by carefully controlling the coke deposition on the catalysts in the first and terminal reactors. Thus in a reforming process wherein a naphtha fraction is contacted with a catalyst comprising platinum in association with a porous solid carrier in a plurality of reactors in series at reforming conditions and in the presence of hydrogen to produce a product of improved octane rating, the present invention for decreasing the yield decline in $C_5+$ gasoline produced comprises periodically removing during the reforming process catalyst samples from at least the first reactor and the last reactor in series, analyzing the amount of coke deposition on the catalyst samples and controlling the severity of reforming in the several reactors in response to the coke analysis of the catalyst samples so that the coke deposition on the catalyst in the first reactor is maintained at less than about one-half of the coke deposition on the catalyst in the last reactor.

The process of the present invention is particularly significant wherein the catalyst used contains from 0.01 to 3 weight percent platinum and from 0.01 to 5 weight percent rhenium.

BRIEF DESCRIPTION OF THE DRAWING

The present invention will be more fully understood by reference to the figure which shows the yield decline in liquid product as a function of the ratio of coke on the catalysts from the first reactor and the last reactors. It is apparent from the figure that when the coke ratio is greater than about 2, the yield decline is significantly decreased.

DESCRIPTION OF THE INVENTION

The present invention is applicable to those reforming systems wherein a plurality of reaction zones in series are used, each reaction zone containing a catalyst comprising a hydrogenation-dehydrogenation component, e.g., platinum. In general preheaters or furnaces will be present between each reactor so that the temperature of the feed to each reactor may be controlled. The present invention is concerned with those systems wherein at least two reactors, and preferably three reactors, are in series. Preferably the reactors involved fixed bed systems. For fixed bed processes, the catalyst is generally in the form of tablets, pellets, spheroidal particles or extruded particles.

Whereas catalyst is present in the several reactors, the volume of catalyst generally differs from one reactor to the other. A typical catalyst loading may involve one-quarter of the total catalyst charge being in the first reactor, one-quarter in the second reactor, and one-half in the last reactor. The first reactor generally contains less catalyst inasmuch as the principal reactions therein are highly endothermic which results in rapid cooling of the feed. Hence a large volume of catalyst in the first reactor would result in part of the catalyst bed not being used inasmuch as the temperature of the feed reaching the lower portion of the bed would be too low for significant dehydrogenation reactions to occur.

The temperature in each of the reactors in series can be the same or different and generally fall within the range from 700 to 1000° F. Inlet temperatures of each of the reactors will generally be within the range of about 900 to 1000° F. The terminal reaction zone generally has the highest average bed temperature. The temperature drop exhibited in each of the catalyst beds generally decreases from the first reactor to the last; for example, the temperature drop in the first reactor in a three-reactor series may be as high as 150° F. while the temperature drop in the terminal reactor may only be zone, and recycled to one or more of the reaction zones. may be an exothermic zone, especially in high octane-high pressure operations. Generally, the pressure in the reaction zones will be the same, either atmospheric or superatmospheric. Preferably the pressure will be within the range of 25 to 1000 p.s.i.g. and more preferably from 50 to 750 p.s.i.g. The temperature and pressure can be correlated with the liquid hourly space velocity (LHSV) to favor any particularly desirable reforming reactions as, for example, aromatization, isomerization, or dehydrogenation. In general, the liquid hourly space velocity will be from 0.01 to 10 and preferably from 1 to 5. It is apparent that with different catalyst loadings in the different reactors the space velocities of the different reaction zones can vary considerably.

The reforming process is conducted in the presence of hydrogen. Inasmuch as reforming generally results in the production of hydrogen, excess hydrogen need not necessarily be added to the reforming system. Thus produced hydrogen can be used to provide the reforming requirements. Hydrogen can be removed from the effluent from any of the reaction zones, preferably the terminal reaction zone, and recycled to one or more of the reaction zones, Hydrogen can be introduced to the feed prior to contact with the catalyst or can be contacted simultaneously with the introduction of the feed to the reaction zone. The presence of hydrogen serves to reduce the formation of coke which tends to poison the catalyst. Also, the presence of hydrogen can be used to favor certain reforming reactions. Hydrogen is preferably introduced into the reforming reactor at a rate which varies from 0.5 to 20 moles of hydrogen per mole of feed. The hydrogen can be in admixture with light gaseous hydrocarbons.

The catalyst in the reaction zone comprises a hydrogenation-dehydrogenation component in association with a porous solid carrier support. Preferably the catalyst comprises a platinum group component, e.g., platinum, palladium, iridium, ruthenium, etc., supported with a porous inorganic oxide as, for example, alumina. The platinum group component will be present in an amount of from 0.01 to 3 weight percent and preferably 0.01 to 1 weight. A platinum group component embraces all the members of Group VIII of the Periodic Table having an atomic weight greater than 100 as well as compounds and mixtures of any of these. Thus, the platinum group component includes compounds, metals, or mixtures thereof. Platinum is the preferred component because of its better reforming activity.

Porous solid carriers which find particular use for reforming are generally the inorganic oxides, particularly inorganic oxides having surface areas of 50 to 750 m.$^2$/gm., preferably 150 to 750 m.$^2$/gm. The carrier can be a natural or a synthetically-produced inorganic oxide or combination of inorganic oxides. Typically acidic inorganic oxide supports which can be used are the naturally occurring aluminum silicates, particularly when acid treated to increase the activity, and the synthetically-produced cracking supports, such as silica-alumina, silica-zirconia, silica-alumina-zirconia, silica-magnesia, silica-alumina-magnesia, and crystalline zeolitic aluminosilicates.

It is generally preferred that the catalysts have low cracking activity, that is, have limited acidity. Thus, it is particularly preferred that alumina be present. Any of the forms of alumina suitable as a support for reforming catalysts can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as as ammonium hydroxide, followed by drying and calcination.

Other components in addition to the platinum group component can be present with the porous solid carrier. It is particularly preferred that rhenium be present, for example, in an amount of from 0.01 to 5 weight percent and more preferably 0.01 to 2 weight percent. Regardless of the form in which rhenium exists on the catalyst, whether as metal or compound, the weight percent is calculated as the metal. Rhenium significantly improves the yield stability of the platinum-containing catalyst, that is, a process using a platinum-rhenium catalyst has a significantly lower yield decline throughout the reforming process than a catalyst comprising platinum without rhenium. The platinum-rhenium catalyst is more fully described in U.S. Pat. 3,415,737.

The catalyst comprising the platinum group component can be prepared in a variety of methods; that is, the platinum group component can be associated with the porous solid carrier by impregnation, ion-exchange, coprecipitation, etc. Generally it is preferred to incorporate the platinum group component by impregnation. When rhenium is incorporated along with the platinum group component, the rhenium component can also be associated with the carrier by various techniques, e.g., impregnation, ion-exchange, coprecipitation, etc. Preferably, the platinum group component and rhenium component are to be associated with the carrier by impregnation, either simultaneously or sequentially. Particularly preferred platinum components for use in impregnation include chloroplatinic acid, ammonium chloroplatinates, polyamineplatinum salts, palladium chloride, etc. Suitable rhenium components are perrhenic acid, ammonium or potassium perrhenates, etc.

Generally the catalyst will be promoted for reforming by the addition of halides, particularly fluoride or chloride. Bromides may also be used. The halides provide a limited amount of acidity to the catalyst which is beneficial to most reforming operations. A catalyst promoted with halide preferably contains from 0.1 to 3 weight percent total halide content. Halides can be incorporated onto the catalyst carrier at any suitable stage of catalyst manufacture, e.g., prior to or following incorporation of the platinum group component and/or the rhenium component. Halide can also be incorporated onto the catalyst during incorporation of the platinum group component or rhenium component.

For the process of the present invention, catalyst samples are periodically removed during the reforming process from at least the first reactor and the last reactor in the series and analyzed for the amount of coke deposition on the catalyst. Generally, catalyst samples are removed from the reactors and an analysis made every 5–10 days for the so-called nonregenerative and semiregenerative reforming processes, i.e., processes which operate for long periods of time between regenerations, for example 500 to 2000 hours or more. For short cycle regeneration systems, i.e., reforming systems wherein the reactors are regenerated every few hours, e.g. 24 to 100 hours, catalyst samples can be removed and analyzed, e.g., every few hours. The process of the present invention is better adapted for the reforming processes having long onstream periods between regenerations. Thus in a reforming process which operates onstream for at least 2000 hours before regeneration of the catalyst, catalyst samples can be removed from the reactors every 5 days and analyzed for carbon. Removal of catalyst samples must be done so as to prevent disruption of the normal reforming process, i.e., catalyst samples should be removed from the reactors without affecting the temperature, pressure or other reforming conditions in the reaction zone.

A variety of means are available for removing catalyst samples from reactors without involving shutdown of the reactor. As examples of means for removing catalyst samples from reactors, see U.S. Pats. 3,129,590 and 3,319,469. The disclosures of these two patents are incorporated herein by reference thereto.

It is desirable to analyze the coke deposition on the catalyst samples as rapidly as possible, particularly when the reforming process involves short onstream times between regenerations. Several means are available for analyzing coke on catalyst samples. Preferably the catalyst samples are first washed in a normal pentane solution to remove any extraneous matter from the catalyst, then vacuum dried to remove normal pentane. The catalyst samples are then weighed and contacted in an oxygen flame for a sufficient time to burn carbon from the catalyst samples. Sufficient oxygen should be present so that the carbon on the catalyst samples is completely converted to $CO_2$. The evolved $CO_2$ is absorbed in a solution, for example, barium hydroxide and the amount measured by titration with an acid, e.g., HCl. Alternately the $CO_2$ evolved is absorbed on a solid absorbent, the amount absorbed being determined by weighing. From the measurement of the $CO_2$ evolved the amount of carbon on the catalyst samples can be determined.

Another method which is not as desirable as the above-described method for measuring coke is to dissolve the support and preferably the metal components thereon and measure the carbon residue left.

Coke analysis of catalyst samples can also be made by heating a bed of catalyst containing coke at an elevated temperature, for example, above 800° F., passing an oxidizing atmosphere such as air through the heated bed of solid at a fixed flow rate to produce a combustion zone in the catalyst sample bed and determining the rate at which the combustion zone progresses through the bed. The rate of progression of the combustion zone through the bed provides the measure of the carbon content of the sample. This procedure is more fully described in U.S. Pat. 3,414,382 which is incorporated herein by reference thereto.

From an analysis of the coke deposition on the catalyst and particularly by determining the rate at which coke is building up in the first reactor relative to the last reactor, the severity of reforming in the several reactors can be controlled in response to the coke analysis so that the coke deposition on the catalyst in the first reactor is less than about one-half the coke deposition on the catalyst in the last reactor. When it is determined by coke analysis of catalyst samples that the coking of the catalyst in the first reactor is occurring faster than that desired, i.e., the coke deposition on the catalyst in the first reactor is greater than about one-half of the coke deposition on the catalyst in the last reactor, the severity of reforming in the several reactors can be adjusted to bring the coke deposition on the catalyst in the several reactors to the proper level. An increase in severity results in an increase in coke deposition, a decrease in severity results in a decrease in coke deposition. Several means can be used to control the severity of reforming in the several reactors. Thus, for example, the temperature in the different reaction zones can be changed. An increase in temperature increases the severity; a decrease in the temperature decreases the severity. Hence, when it becomes apparent from coke analysis of catalyst samples during the reforming process that the coke deposition on the catalyst in the first reactor is greater than about one-half the coke deposition on the catalyst in the last reactor, the temperature in the first reactor can be decreased thereby decreasing severity and coke deposition. Alternately, the temperature in the terminal reactor could be increased by increasing severity and increasing coke deposition. Lowering of the temperature in the first reactor is preferred to raising the temperature in the terminal reactor.

Other means are available for changing the severity of reforming in the several reactors, including varying the pressure and changing the space velocity in the different reactors. Decreasing the pressure in a reactor will increase the severity and hence increase the coking. Generally, special equipment, e.g., special valve systems, etc., is required to vary the pressure from one reactor to another. Decreasing the space velocity will increase the severity of operation, a constant conversion being maintained. Thus, decreasing space rate generally results in more extensive coking, the conversion to constant octane product being maintained at a certain level. In a situation where the coke deposition on the catalyst in the first reactor is exceeding that of one-half of the coke deposition in the terminal reactor as measured by coke analysis of catalyst samples, a decrease in the space velocity in the terminal reactor relative to the first reactor will help bring the coke deposition in the two reactors back to the desired level. The space velocity in the terminal reactor can be decreased as, for example, by bleeding a portion of the feed from the first or intermediate reactor and bypassing the terminal reactor with this sidestream.

As a practical matter, it is preferred that the coke deposition on the catalyst in the first reactor be maintained from one-half to one-tenth that of the coke deposition on the catalyst in the last reactor, more preferably one-third to one-tenth, and most preferably one-third to one-fourth. Thus, stated another way the coke deposition on the catalyst in the terminal reactor is preferably maintained from 2 to 10, more preferably 3 to 10, and most preferably 3 to 4 times the coke deposition on the catalyst in the first reactor.

The process of the present invention will be more fully understood by reference to the following example.

EXAMPLE

Several reforming processes using three reactors in series with preheaters before each reaction zone were studied. The $C_5+$ liquid yield decline was determined as a function of the ratio of coke on the last reactor relative to the first reactor. The results of the runs are plotted in terms of yield decline of $C_5+$ liquid product as a function of the ratio of coke on the catalyst in the last reactor to coke on the catalyst in the first reactor and shown in the figure.

Points $a$, $b$ and $c$ in the figure were obtained using a feed comprising 40 volume percent naphthenes, 36 volume percent paraffins and 24 volume percent aromatics. The feed had an initial boiling point of 150° F. and an end boiling point of 425° F. The catalyst used in each of the three reactors comprised 0.6 weight percent platinum, 0.6 weight percent rhenium and 0.6 weight percent chloride in association with alumina. In each case the volume of catalyst in the first, second and third reactors was 25 percent and 50 percent of the total catalyst charge, respectively. The reforming conditions were conducted at a pressure of about 500 p.s.i.g., measured at the outlet of the last reactor, to produce 97 F-1 clear octane product. The average catalyst temperatures were in the range from 900 to 970° F. For one of the operations, the ratio of coke on the catalyst in the last reactor to coke on the catalyst in the first reactor was about 0.9 (point $a$); for another operation, about 1.6 (point *b*); and for the third operation, about 1.7 (point *c*).

For the reforming process having a coke ratio depicted by point *d* in the figure, a three-reactor system was used containing a catalyst comprising 0.3 weight percent platinum 0.3 weight percent rhenium and 0.6 weight percent chloride supported on alumina. The volume of catalyst in the several reactors was 25 percent for the first reactor, 25 percent for the second reactor and 50 percent for the third reactor. The feed reformed was a naphtha containing 30 volume percent naphthenes, 10–15 volume percent aromatics and 55–60 volume percent paraffins. The feed had an initial boiling point of 220° F. and an end boiling point of 370° F. Reforming conditions included a pressure of about 500 p.s.i.g., measured at the outlet of the last reactor, and temperatures in the range of 900 to 970° F. 93 and 98 F–1 clear octane product was alternately produced. A ratio of coke on the catalyst in the last reactor to coke on the catalyst in the first reactor of about 2.6 was maintained.

For the reforming operation having a coke ratio depicted by point *e*, a three-reactor system was used containing a catalyst comprising 0.6 weight percent platinum, 0.6 weight percent rhenium and 0.6 weight percent chloride, supported on alumina to reform a feed containing 50 volume percent naphthenes, 10 volume percent aromatics and 40 volume percent paraffins. The feed had an initial boiling point of about 200° F. and an end boiling point of about 400° F. The reaction conditions included a temperature range of from 880 to 950° F. and a pressure of approximately 500 p.s.i.g., measured at the last reactor outlet, to produce an F–1 clear octane product of approximately 90. The ratio of coke on the catalyst in the last reactor to coke on the catalyst in the first reactor was maintained at about 4.

It is evident from the curve in the figure that the ratio of coke in the last reactor to that in the first reactor is very important in controlling the yield decline throughout the reforming process. In order to obtain an extremely low yield decline, e.g., less than about 1 volume percent, it is desirable that the coke ratio be from about 2 to 4, preferably 3 to 4. Expressed another way, it is preferred that the coke deposition on the catalyst in the first reactor be about one-half to one-fourth, preferably one-third to one-fourth the coke deposition on the catalyst in the last reactor.

The yield decline was determined as the decrease in $C_5+$ yield from start of run to an onstream time when about 10 percent coke was deposited on the catalyst in the last reactor for the process using the 0.3 weight percent platinum, 0.3 weight percent rhenium catalyst (process described with reference to point *d* in the figure. The yield decline was determined as the decrease in $C_5+$ liquid yield from start of run to an onstream time when about 16 weight percent coke was deposited on the catalyst in the last reactor for the processes using the 0.6 weight percent platinum, 0.6 weight percent rhenium catalyst (process described with reference to points *a*, *b*, *c*, and *e* in the figure).

The foregoing disclosure of this invention is not to be considered as limiting since many variations can be made by those skilled in the art without departing from the scope or spirit of the appended claims.

What is claimed is:

1. In a reforming process wherein a naphtha fraction is contacted with a catalyst comprising a platinum group component in association with a porous solid carrier in a plurality of reactors in series at reforming conditions and in the presence of hydrogen to produce a product of improved octane rating, the improvement which comprises periodically removing during the reforming process catalyst samples from at least the first reactor and the last reactor in the series, analyzing the mount of coke deposition on the catalyst samples and controlling the severity of reforming in the several reactors in response to the coke analysis of the catalyst samples so that the coke deposition on the catalyst in the first reactor is maintained at less than about one-half the coke deposition on the catalyst in the last reactor.

2. Process of claim 1 wherein the catalyst contains from 0.01 to 3 weight percent platinum.

3. Process of claim 1 wherein the catalyst contains from 0.01 to 3 weight percent platinum and from 0.01 to 5 weight percent rhenium.

4. Process of claim 1 wherein the porous solid carrier is alumina.

5. Process of claim 1 wherein the severity of reforming in the several reactors in response to the coke analysis of the catalyst samples is controlled so that the coke deposition on the catalyst in the first reactor is maintained at less than about one-third the coke deposition on the catalyst in the last reactor.

6. In a reforming process wherein a naphtha fraction is contacted with a catalyst comprising from 0.01 to 3 weight percent platinum and 0.01 to 5 weight percent rhenium in association with alumina in three reactors in series at reforming conditions in the presence of hydrogen to produce a product of improved octane rating, the improvement which comprises periodically removing during the reforming process catalyst samples from at least the first reactor and the last reactor in series, periodically analyzing the amount of coke deposition on the catalyst samples and adjusting the severity of reforming in the several reactors in response to change in the coke deposition analysis of the catalyst samples so that the coke deposition on the catalyst in the first reactor is maintained at from one-third to one-tenth the coke deposition on the catalyst in the last reactor.

7. Process of claim 1 wherein the coke deposition on the catalyst in the first reactor is maintained at from one-third to one fourth the coke deposition on the catalyst in the last reactor.

References Cited

UNITED STATES PATENTS

| | | | |
|---|---|---|---|
| 2,965,560 | 12/1960 | Smith | 208—138 |
| 3,024,186 | 3/1962 | Newby et al. | 208—139 |
| 3,091,584 | 5/1963 | Singer | 208—65 |
| 3,117,073 | 1/1964 | Hertwig et al. | 208—65 |
| 3,375,190 | 3/1968 | McHenry et al. | 208—65 |
| 3,392,107 | 7/1968 | Pfefferle | 208—65 |

HERBERT LEVINE, Primary Examiner

U.S. Cl. X.R.

208—138, 140